(12) United States Patent
Dublin, III (10) Patent No.: US 9,652,773 B1
(45) Date of Patent: May 16, 2017

(54) TWO-SIDED TOUCH SCREEN DISPLAY

(76) Inventor: Wilbur Leslie Dublin, III, Austin, TX (US)

( * ) Notice: Subject to any disclaimer, the term of this patent is extended or adjusted under 35 U.S.C. 154(b) by 0 days.

(21) Appl. No.: 12/409,615

(22) Filed: Mar. 24, 2009

(51) Int. Cl.
*G06F 3/041* (2006.01)
*G06Q 30/00* (2012.01)

(52) U.S. Cl.
CPC ............. *G06Q 30/00* (2013.01); *G06F 3/041* (2013.01)

(58) Field of Classification Search
CPC ....................................................... G06F 3/041
See application file for complete search history.

(56) References Cited

U.S. PATENT DOCUMENTS

| | | | | |
|---|---|---|---|---|
| RE31,054 E | * | 10/1982 | Harvey | H01J 17/494 313/582 |
| 4,918,631 A | * | 4/1990 | Hara | G06K 19/07 235/380 |
| 7,324,093 B1 | * | 1/2008 | Gettemy | G06F 1/1622 178/18.01 |
| 2005/0168422 A1 | * | 8/2005 | Oh | G02F 1/133308 345/87 |
| 2006/0273100 A1 | * | 12/2006 | Cittadino | A47K 10/426 221/33 |
| 2008/0150903 A1 | * | 6/2008 | Chuang | G06F 1/1616 345/173 |
| 2009/0073085 A1 | * | 3/2009 | Saneto | H05K 9/0096 345/36 |
| 2010/0065342 A1 | * | 3/2010 | Shaikh | G06F 3/044 178/18.06 |

* cited by examiner

*Primary Examiner* — Jennifer Mehmood
*Assistant Examiner* — Carl Adams
(74) *Attorney, Agent, or Firm* — James A. Italia; Italia IP (57) ABSTRACT

A two-sided touch screen unit is disclosed. In one embodiment, the two-sided touch screen unit includes a housing. A first touch screen positioned in the housing faces a first direction, while a second touch screen is positioned in the housing facing in a second direction that is substantially the opposite of the first direction. At least one attenuation layer is positioned between the first touch screen and the second touch screen.

2 Claims, 5 Drawing Sheets

TWO-SIDED TOUCH SCREEN DISPLAY

BACKGROUND OF THE INVENTION

1. Field of the Invention

This invention relates to display devices, and more particularly, to touch-screen display devices.

2. Description of the Related Art

Displays that can detect a presence of a touch are known as touch screen displays, and can be used to operate an electronic system in which they are incorporated. Touch screen displays are used in a wide variety of electronic devices. Such devices include computer systems, portable music players (e.g., MP3 players), kiosk applications in retail environments (e.g., in a music store to allow a customer to sample music for sale), and so forth.

Touch screen displays come in a variety of types, including resistive touch screens, surface acoustic wave touch screens, and capacitive touch screens. A panel in a capacitive touch screen may include a sensor that is coated with a material that conducts a continuous electric current across sensor. The electric current across the sensor results in an electric field having both a horizontal and vertical axis, thereby achieving capacitance. A human body may also store electrons, and therefore exhibits capacitance. When a human being touches the touch screen, the sensor's electric field is thus altered by the capacitance of the human being providing the touch. The distortion in the sensor's electric field can be measured, and this information can be sent to an electronic device for further processing to determine the location of the touch. Based on determination of the location of the touch, the electronic system in which the touch screen is implemented may take further action, such as selecting an item, navigating to a new location, or other appropriate actions.

SUMMARY OF THE INVENTION

A two-sided touch screen unit is disclosed. In one embodiment, the two-sided touch screen unit includes a housing. A first touch screen is positioned in the housing facing a first direction, while a second touch screen is positioned in the housing facing in a second direction that is substantially the opposite of the first direction. At least one attenuation layer is positioned between the first touch screen and the second touch screen.

A tabletop display device is also disclosed. In one embodiment the tabletop display includes a housing, a first touch screen positioned in the housing and facing a first direction, and a second touch screen is positioned in the housing facing in a second direction that is substantially the opposite of the first direction. The tabletop display device also includes an electronics unit, wherein the electronics units includes at least one electronic device configured to, responsive to a touch on the first touch screen, process first information, and further configured to, responsive to a touch on the second touch screen, process second information, wherein processing said first information and processing said second information are performed independently of one another.

In various embodiments, the first and second touch screens may be capacitive touch screens, while the at least one attenuation layer is made of an electrically conductive material. The first and second capacitive touch screens may be in close proximity to each other. The attenuation layer, coupled to a ground plane, provides a path to ground and may prevent a touch on one side of the screen from registering on the other side of the screen.

The attenuation layer may be implemented in various ways. In one embodiment, a single attenuation layer made of an electrically conductive wire mesh may be positioned between the first and second touch screens. In another embodiment, a backlight diffuser may be centrally positioned, with a conductive film or foil applied to at least one side of the backlight diffuser. The conductive film or foil may include apertures on each of the backlight diffuser in order to enable light to pass through to the touch screen and display on the respective side. In yet another embodiment, the attenuation layer may be implemented using a recess positioned between the first and second touch screens. The recess may include a conductive paint or other type of conductive material applied to its inner surfaces. Batteries, electronic circuitry, or both may be placed in the recess to provide additional attenuation.

A tabletop display device implementing a two-sided touch screen may enable two different users to operate the device at the same time, independently of one another. For example, in a restaurant environment, a user operating a touch screen on a first side of the tabletop display device could view various menu items such as appetizers, while a second user operating a touch screen on the second side of the device, could view a drink menu. As such, a tabletop display device having a two-sided touch screen unit may be able to more efficiently deliver promotional content than a similar device with a single display. Furthermore, the ability to place two capacitive touch screens back-to-back in close proximity to each other may enable the tabletop display device to be implemented with a more compact housing.

BRIEF DESCRIPTION OF THE DRAWINGS

Other aspects of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all

DETAILED DESCRIPTION OF THE INVENTION

Figure 1A:
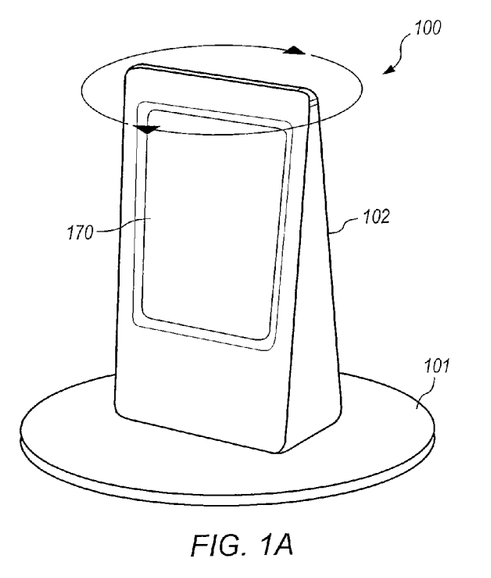
FIGS. 1A and 1B are perspective views of one embodiment of a tabletop display device having a two-sided touch screen.
Figure 1B:
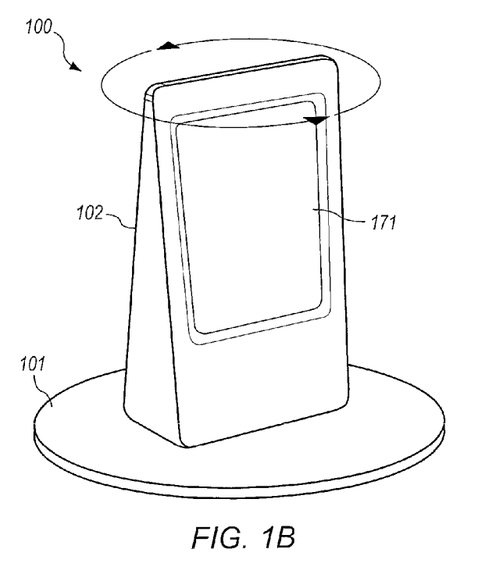

FIGS. 1A and 1B are perspective views of one embodiment of a tabletop display device having a two-sided touch screen. More particularly, tabletop display device 100 includes a first touch screen 170 facing in a first direction and a second touch screen 171 facing in a second direction that is substantially opposite of the first direction. Touch screens 170 and 171 are positioned within housing 102 in the embodiment shown. The various layers of content may be accessed by users operating first and second touch screens 170 and 171. Furthermore, a user operating first touch screen 170 may access content independently of content accessed by a used operating second touch screen 171, and vice versa.

The tabletop display device 100 may be deployed in a wide variety of environments in order to deliver various types of content in a restaurant. In one particular implementation, tabletop display device 100 may be used to deliver advertising and promotional content. A number of tabletop display devices 100 may be deployed in the restaurant, with one or more tabletop display devices at each table. Patrons at a table having a tabletop display device 100 may access, through touch screens 170 and 171, items displayed on various menus (e.g., appetizers, entrees, side dishes, drinks), may view promotional items (e.g., a promotion for a certain brand of beer), and so forth. Furthermore, the content accessible from tabletop display device may be further customizable depending on the particular type of venue and the demographic of a typical patron. For example, a restaurant that typically attracts a significant number of sports fans, the content may include sports scores, statistics, fantasy sports information, and other sports news. Since tabletop display device 100 includes touch screens 170 and 171 that face in substantially opposite directions, a user on one side can access content independently of a user on the other side. Thus, while one user is accessing sports scores using touch screen 170, another user may independently access an appetizers menu through touch screen 171, to give one of many possible examples.

Other content that may be displayed on touch screens 170 and 171 of display device 100 include movie advertisements, sports scores, weather, news, movie advertisements, and so on. The content may include full motion video, as well as non-moving graphics and text. In general, a wide variety of content may be displayed by tabletop display device 100 in various formats. The content may be varied based on a number of factors, including location (i.e. the particular venue, as well as the larger geographic location), time of day, demographic information (e.g., local demographics or demographics of typical venue patrons), season, and so on. The content may be accessed from another tabletop display device 100 in the same venue, from a local server, or from a remote server.

In other embodiments, a display device with capabilities equivalent or similar to that of tabletop display device may be used which does not necessarily have to be on, in, or even designed as a tabletop unit—for instance, it may be implemented as a wall or door-mounted unit (the former might be useful for restroom advertising in any kind of venue, the latter to keep restaurant wait staff informed of specials and dish availability as they move in and out of the kitchen), at bar counters, host/hostess stands, waiting areas, or at other appropriate locations at a suitable venue. If used as a discrete tabletop unit, then tabletop display device 100 may be integrated with or contained by a receptacle for tabletop condiments such as salt, pepper, sweeteners, sauces, etc. The tabletop display device 100 and/or the receptacle may also be mounted on a motorized or non-motorized "lazy susan" type of turntable (e.g., such as turntable 101 shown in FIGS. 1A and 1B) bearing allowing the device to be more easily viewed from various points around or nearby the table.

Figure 2:
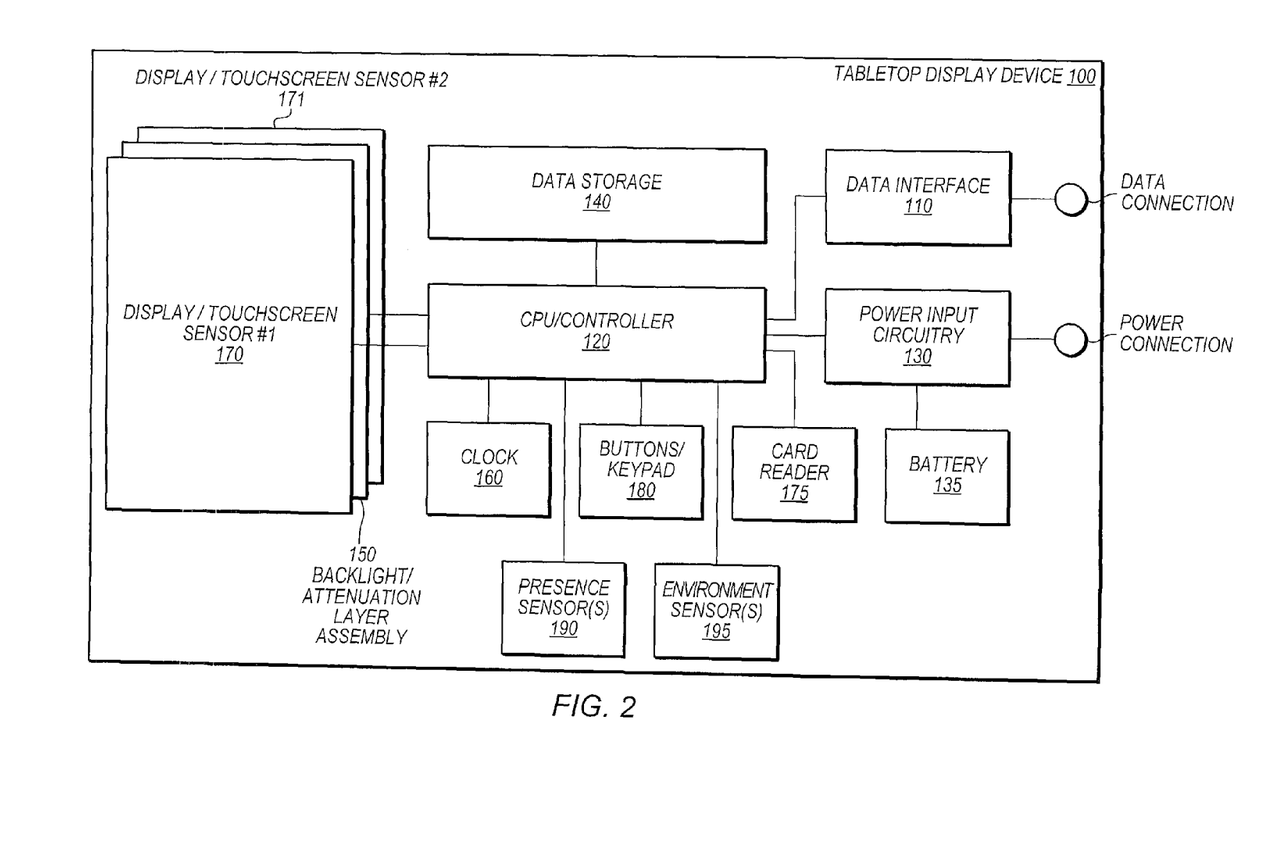
FIG. 2 is a block diagram of one embodiment of a tabletop display device having a two-sided touch screen.

Turning now to FIG. 2, a block diagram of one embodiment of a tabletop display device having a two-sided touch screen is shown. In the embodiment shown, tabletop display device 100 includes two touch screens 170 and 171, which are positioned back to back with a backlight/attenuation layer assembly 150 positioned therebetween. The backlight/attenuation layer assembly includes at least one backlight diffuser and at least one attenuation layer, various embodiments of which will be discussed in further detail below. The touch screens 170 and 171 may be independently controlled with respect to each other, and may use separate control lines. If touch screens 170 and 171 are light-emitting, the Computerized Control Unit 120 present in each Tabletop Display Device 100 may optionally control the brightness of each based on any combination of clock time, time window (an interval in time, possibly recurring), ambient light levels, or brightness of the content in order to maintain the proper ambience and atmosphere of the restaurant or bar venue's environment.

The tabletop display device 100 may be self-contained (including power supply such as a battery 135), but it may alternatively rely on external resources for power and/or data. Typically, A tabletop display device 100 will be either self-contained and battery-powered, or tethered by an external power and/or data connection, for example, 802.3af Power-over-Ethernet, which provides in a single unified connection both battery charging and power connection 300 as well as data connection 400. Other arrangements are possible as well, for instance, a self-contained battery-powered unit (with an optional battery charging and power connection 300) that embodies data connection 400 as a wireless data connection for content replication and/or interaction communications with the patrons at the restaurant/bar venue. For suitably low-power touch screens 170 and 171, power for the tabletop display device 100 may also be locally generated (e.g.: by solar cells or fuel cell generators powered by methanol, propane, hydrogen, or other appropriate fuels) and optionally stored in local energy storage systems (e.g.: batteries or large capacitors, which may be removable and replaceable for convenience). If the displays are self-contained, the content they contain may be updated over a data connection 400 either by continuous or intermittent connections to a communications station (which may be integrated with a battery charging unit) or alternatively, by a wireless data link. In either case, the content may be replicated and distributed using proprietary methods or well-known standard techniques such as distributed file synchronization (e.g.: rdist, Unison, SyncToy, scripted FTP or file copy, etc.), version and/or revision control systems (e.g.: RCS, CVS, Subversion, etc.), or by a store and forward delivery system (e.g.: e-mail or uucp). Depending on the behavior desired, this content synchronization may be triggered and managed by an "upstream" computer or controller or by the tabletop display device 100 itself—that is, the data transfer may be "push", "pull", or a combination of both. Note that the direction of information flow does not necessarily have to be "downstream" toward the tabletop display device 100. One example of this might have the device collecting an auditable log of patron presence, interactive usage, display statistics, and other information that could be transferred "upstream", while also allowing new content and control metadata instructions to flow "downstream" either simultaneously or interleaved with the upstream transmission, depending on whether full or half-duplex communications are available.

In the embodiment shown, tabletop display device 100 contains a computerized control unit 120. This computerized control unit 120 has access to data storage 140, which may or may not be logically and/or physically divided to contain the executable software code and/or other programs for the tabletop display device 100 itself (which may also include executable programs for updating said software and/or firmware). Data storage 140 may also provide storage for the actual advertising or promotional content and control metadata data about how and when that content data should be delivered through the device's display and optionally housekeeping information such as a unique Unit ID and "health and status" information that may be used and analyzed for a variety of purposes. In a typical configuration, the data storage 140 for advertising and promotional content may include the various content elements themselves along with control metadata. This control metadata (which may vary from a simple "play list" of sequenced content identifiers to complex programmable presentations dependent on a variety of internal or external variables) defines when and how the tabletop display device 100 should present the content elements. For example, the control metadata might include a schedule determining which advertisements and promotions are set to run during a pre-defined time window, but may also encompass more complex behavior such as "if new patrons have not already been sensed in the past fifteen minutes (to avoid false triggering by up-and down re-seating or returns from the restroom, etc.) then display a specific advertisement for twenty-five seconds after detecting newly seated patrons, switch to content related to specials, and change the default update interval to 15 seconds". The control metadata may be a text or binary representation, but will typically be a tag-structured text format such as Extensible Markup Language (XML) or a directly interpretable data format such as JavaScript Object Notation (JSON).

The content elements may be comprised of or include (but are not limited to):

1) images in either bitmap (e.g.: JPG, PNG, GIF, etc.) or vector (e.g.: SVG, Flash, NAPLPS, etc.) form,
2) web pages or other display markup (e.g.: HTML/CSS, XHTML/XSL, PDF, etc.), or
3) moving images (e.g.: Animated GIF, Flash, MPEG, WMV, Quicktime, MNG, etc.) and/or audio (e.g.: MP3, AAC, WAV, etc.). Moving images may optionally include audio, which is primarily useful in settings other than those that are the primary target for the invention, since audio is generally undesirable in those settings.

In addition, the tabletop display device 100 may contain an internal clock 160 that can be used along with the control metadata residing in data storage 140 to trigger a set of actions at a particular time. A typical example of this might be a set of control metadata to switch from content appropriate for Breakfast to that appropriate for Lunch at a specific single point in time, or alternatively, to phase in the content from Breakfast to Lunch over a period of time. Such control metadata may also be responsible for determining appropriate advertising or promotional content based on a variety of other criteria that may or may not be related to time, such as (but not limited to) number of views or impressions, weather or other external data, environmental information such as temperature/humidity, ambient lighting, presence and number of patrons, direct patron interaction, etc.

A further potential use of the internal clock 160, if made sufficiently accurate, is to synchronize and/or coordinate the changes in content across multiple tabletop display Units 100 in a particular room or venue, to avoid the "Vegas effect" of many such displays changing in a haphazard fashion. Managing screen transitions in this way may be important in maintaining the desired "atmosphere" of a restaurant or bar venue, especially if the display screen technology in use emits light. Such screen transition management may even involve coordinated schemes where the mix of "light" and "dark" screen images at a given time may be controlled and coordinated with the style and type of image transition (e.g.: fade/fade rate, direct cut, or animated transition effect) to ensure the average light intensity emitted by multiple instances of tabletop display device 100 is maintained within a desired range across a room or venue. Such brightness coordination schemes might rely on pre-programmed schedules, or adaptive systems based on ambient light measurements, or possibly even dynamic communications with other instances of tabletop display device 100 at the venue, either directly or through a central venue controller such as a venue support server. In such a system, the effective luminosity of each promotional or ad screen image may be pre-computed by an upstream server and distributed as part of the metadata or computed locally after the content has been replicated to the tabletop display device 100. Either cooperative scheduling or dynamic interaction between units (either in real time, or pre-negotiated through an intermediary system such as the aforementioned venue support server) can then be used to ensure the average intensity level in a room stays roughly the same. A similar result can be achieved by pre-computing a rotation schedule for each device that allows the average brightness to remain relatively static for all devices in the room by offsetting a bright image on one device with a dark one on a neighboring device.

The tabletop display device 100 may also optionally include a number of inputs, for interactive response by patrons and/or for sensing of the local environment. Interactive capability may be provided by means of a touch sensing capability for the touch screens 170 and 171, or input Buttons 180 such as a keyboard or keypad, individual function buttons, or "touch-pad" areas (for instance a button to call the waiter or waitress) on the device, or a combination of the above.

Environmental sensing capability may be provided by environmental sensors 195 using simple sensors such as an ambient light sensor (which can be used to adjust the display intensity if the display technology employed emits light), or more complex sensors including a presence sensor 190 to measure or indicate the presence of a suitable human audience. Technologies for the presence sensor 190 may range from passive systems like simple passive infrared motion sensing to complex image processing systems such as shape or object recognition based on still or moving images from one or more embedded cameras. In the latter case, such image processing capabilities may include the ability to determine a count of the number of people present at the table as well as other possible demographic information such as approximate age and sex.

Further interactivity may optionally be provided with personal electronic devices such as wireless phones or PDAs or even with other instances of tabletop display device 100 through means such as "beaming" of contact, calendar, or other data over passive or directed infrared data links (such as those commonly used by modern PDAs and computers), or point-to-point or networked data communications or transfer via other means such as Bluetooth, ZigBee, WiFi, or proprietary wireless data links. The latter sort of point-to-point communications links may be used to establish a "mesh network" which allows "live" or interactive traffic to hop through multiple instances of tabletop display device 100 en route to a gateway or other eventual destination. Note that data interface 110 may allow more than one communications method, and that each of these physical network layers may conceivably be used for multiple purposes to communicate with both the rest of the network comprising the invention and/or with other external devices such as personal electronic devices.

Tabletop display device 100 may also facilitate interactivity with wait staff and/or other systems at the venue, from mechanisms as simple as a "call button" to summon a server, to touch screen menus to place drink, food or dessert orders, to a "remote checkout" system that would allow the patron to settle his bill electronically and securely eliminating the need to wait for the server to provide this service. The call button function, for instance, could be as simple as activating an "attention needed" light (similar to those used on airliners) located at the top of tabletop display device 100, or as complex as a wireless signal to a server at the venue that relays a message to contact the server via a notification such as display on a device such as a pager, phone, PDA, or electronic order-entry device. To enable the remote checkout function, the tabletop display device 100 may optionally contain an electronic Card and/or RFID reader 175 to collect payment information (e.g.: from a credit or debit card) and settle the bill at the table. The software running on the computerized control unit 120 of a device so equipped could allow easy splitting of checks in large parties, something that is so troublesome, error-prone, and time consuming with conventional methods that many restaurants and bars decline to do it. In the case where the tabletop display device 100 allows a high degree of live interactivity, individual patrons in the party may be able to order drinks, appetizers, or even their meal using the device, and they could later easily select the items that were theirs from the table check, add a tip, and settle the bill instantly using electronic payment such as a credit or debit card (or alternatively by leaving the indicated amount of cash behind). Electronic credit or debit transactions would be securely encrypted by the tabletop display device 100 and communicated back to a venue support server or to some other interface to the venue's point-of-sale computer system or a third-party point-of-sale transaction system via a wired or wireless network link.

Figure 3:
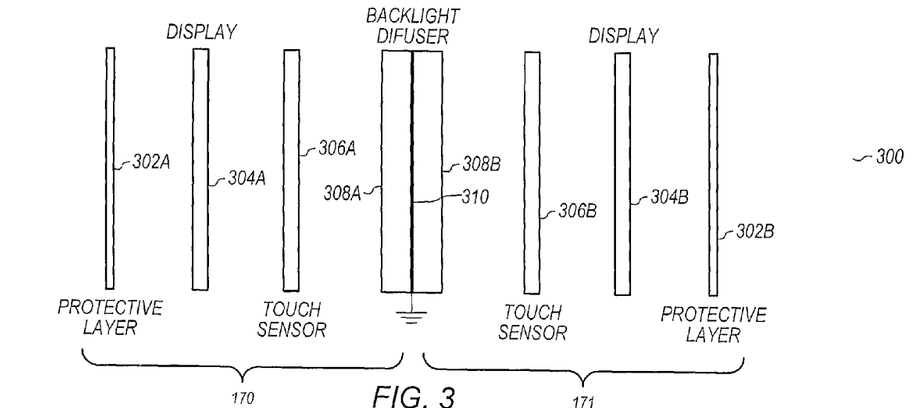
FIG. 3 is a side view of one embodiment of a two-sided touch screen.
Figure 4:
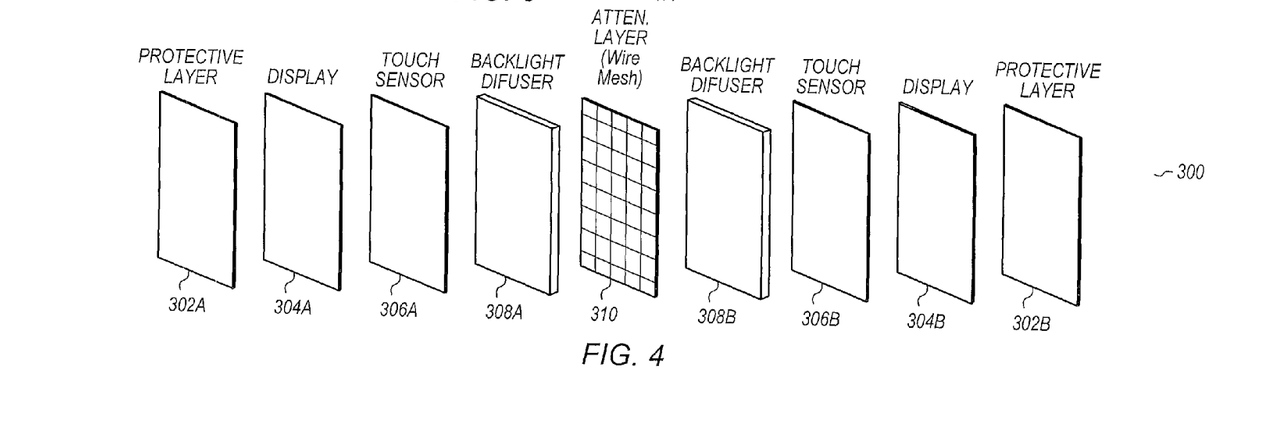
FIG. 4 is a perspective view of one embodiment of a two-sided touch screen including a wire mesh attenuation layer.

The executable software code stored in data storage 140 and running in the computerized control unit 120 of the tabletop display device 100 may also provide entertainment and information to patrons, for instance trivia questions or brainteaser games that might help wait time pass faster. These games and diversions may or may not be interactive depending on the capabilities of the particular tabletop display device 100. In addition, the tabletop display device 100 may show a live or stored feed of general interest information such as weather, news, or sports scores for the same purpose. These features may also be sponsored by advertisers and have sponsorship frames or linked advertising content associated with them in devices capable of interactivity. Note that interactivity for these entertainment and information features may be provided using not only in-band "live" communications, but also any of the out-of-band methods that can be used to respond to advertisements and promotions, Turning now to FIG. 3, a side view of one embodiment of a two-sided touch screen that may be implemented in tabletop display device 100 is shown. FIG. 4 is a perspective view of the same embodiment. In this particular embodiment, touch screen unit 300 includes protective layers to 302A and 302B, displays 304A and 304B, touch sensors 306A and 306B, backlight diffusers 308A and 308B, and an attenuation layer 310. Those components shown here designated with an 'A' may be considered part of touch screen 170 while those shown here designated with a 'B' may be considered part of touch screen 171.

In the embodiment shown, touch sensors 306A and 306B are capacitive touch sensors. During operation of a tabletop display device 100 that includes touch screen unit 300, an electric field is generated across each of touch sensors 306A and 306B causing both to exhibit a capacitance. A human body stores electrons, and thus also exhibits a capacitance. Thus, when a person touches one of touch sensors 306A or 306B, its respective electrical field is distorted. This distortion may be sensed by computerized control unit 120 (of FIG. 2) to determine the location of the touch. Based on the location of the touch, computerized control unit 120 may respond by displaying new information on the screen.

Due to the close proximity of touch sensors 306A and 306B to each other, attenuation layer 310 is included in touch screen unit 300. In this particular embodiment, attenuation layer 310 is sandwiched between backlight diffusers 308A and 308B. Attenuation layer 310 in this embodiment is made of a conductive material, and is coupled to an electrical ground. In the embodiment shown in FIG. 4, attenuation layer 310 is a wire mesh. In other embodiments, attenuation layer 310 may be a sheet of conductive material (e.g., foil), conductive paint, or any other suitable means of implementing a conductive layer. Without the presence of attenuation layer 310, a touch on one side of touch screen unit 300 (e.g., a touch on protective layer 302A) might be interpreted by computerized control unit 120 to have occurred on both touch sensors 306A and 306B. However, the presence of attenuation layer 310 in the embodiment shown provides a path to ground, and may thereby prevent a touch from one side being sensed on the other side as well as on the side on which it occurred. More particularly, positioning at least one attenuation layer between the two touch sensors may prevent the electric field on a second of the two touch sensors from being disturbed when the electric field of a first touch sensor is disturbed by a user touch, and vice versa. Thus, a touch on one side may be attenuated at the attenuation layer and thus prevented from registering on the other side. Furthermore, concurrent touches on opposite sides may be sensed and processed independently of one another. Accordingly, the ability to prevent a the distortion of the respective electric fields on both sides of touch screen unit 300 responsive to a touch on only one side may enable two different users to operate the touch screen unit 300 (and thus the tabletop display unit 100 in which it is implemented) independently of one another. In turn, this may allow a single tabletop display unit 100 to deliver more content per instance than a single-sided tabletop display unit.

In the embodiment shown, each touch screen 170 and 171 includes a backlight diffuser (308A, 308B), a display (304A, 304B), and a protective layer (302A, 302B). The displays 304A and 304B may be LCD's (liquid crystal displays), plasma displays, or any other suitable type of display.

Protective layers 302A and 302B may be provided if necessary to provide protection of displays 304A and 304B, respectively, from damage or wear that might otherwise occur from frequent touches or other events. However, the protective layer and display on each side may have dielectric properties such that a touch on the surface the protective layer is sufficient to cause a distortion of the electric field on the corresponding touch sensor, thereby enabling a touch to be sensed.

Backlight diffusers 308A and 308B are each positioned between a respective touch sensor and attenuation layer 310 in this particular embodiment. Backlight diffusers 308A and 308B are arranged to provide light through their respective displays. Light may be projected into each of backlight diffusers 308A and 308B from one or more of the sides, top, or bottom.

Figure 5:
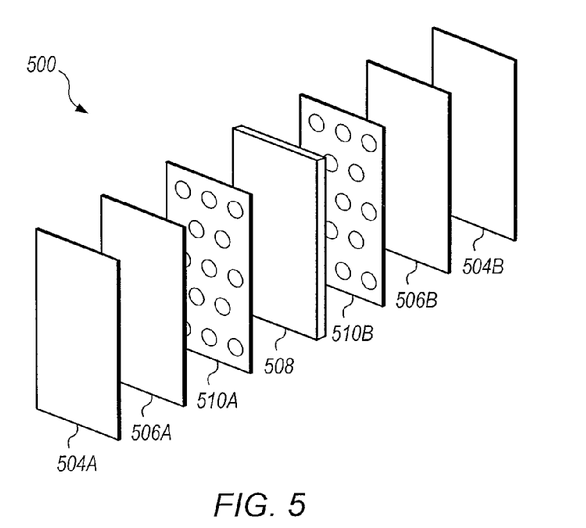
FIG. 5 is a perspective view of another embodiment of a two-sided touch screen unit having a backlight diffuser and attenuation layers on the sides of the backlight diffuser.

FIG. 5 is a perspective view of another embodiment of a two-sided touch screen unit 500 having a backlight diffuser and attenuation layers on the sides of the backlight diffuser. The embodiment shown includes displays 504A and 504B and touch sensors 506A and 506B. Although not explicitly shown here, this embodiment may also include protective layers positioned similarly to the protective layers 304A and 304B of FIGS. 4 and 5.

Figure 6:
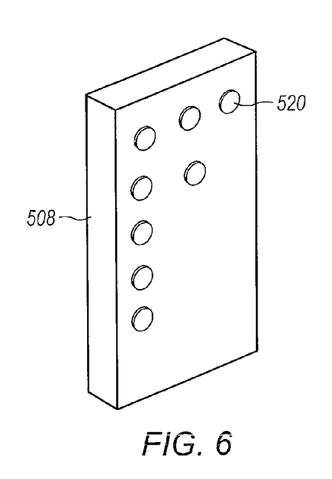
FIG. 6 is a perspective view of one embodiment of a backlight diffuser as shown that may be used with the embodiment of FIG. 4.
Figure 7:
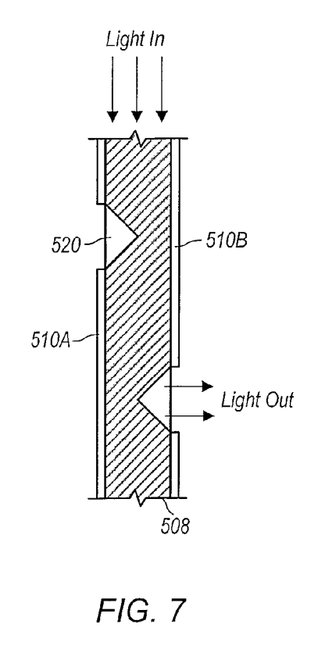
FIG. 7 is a side view of one embodiment of a backlight diffuser that may be used with the embodiment of FIG. 5.

In this particular embodiment, backlight diffuser 508 is centrally positioned, with a first attenuation layer 510A on a first side and a second attenuation layer 310B on a second side. Attenuation layers 510A and 510B may be made of a layer of conductive material, such as foil, a copper sheet, conductive paint, or any other suitable type of conductive material. As shown in FIGS. 6 and 7, each attenuation layer 510A and 510B may include a plurality of apertures 520 that enable the passage of light from backlight diffuser 508. It is noted that not all of the apertures 520 are shown, but it should be understood that each of the attenuation layers 510A and 510B include a number of apertures 520 that may be distributed substantially evenly across their width and length. Light may be directed into backlight diffuser 508, and may exit through apertures 520. As shown in FIG. 7, the apertures 520 of attenuation layer 510A are offset with respect to those of attenuation layer 510B.

Figure 8:
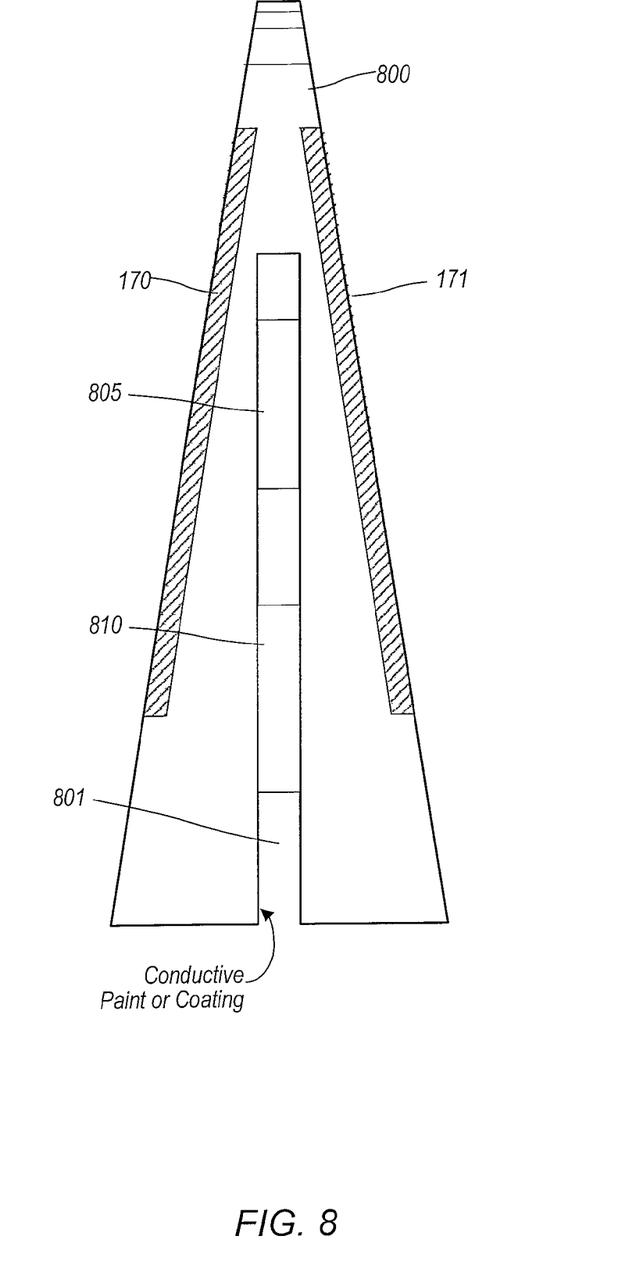
FIG. 8 is a side view of one embodiment of a two-sided touch screen having a recess between the two touch screens.

FIG. 8 is a side view of yet another embodiment of tabletop display device having a two-sided touch screen. In this particular embodiment, tabletop display device 800 implements an attenuation layer by providing a recess 801 positioned between the first touch screen 170 and second touch screen 171. It should be noted that touch screens 170 and 171 may include at least some of the various components discussed above relative to the other embodiments, including displays, touch sensors, and protective layers.

In the embodiment shown, recess 801 may include a conductive paint or other type of conductive material applied to the inner walls thereof. Although not explicitly shown, the conductive paint/coating may be coupled to an electrical ground in order to provide a discharge path.

Tabletop display device 800 may also include a battery pack 805 and an electronics unit 810. Battery pack 805 may include one or more batteries that are used to provide power to tabletop display device 800. Electronics unit 810 may provide housing for electronic circuitry, including one or more of the elements discussed above in reference to FIG. 2. It should be noted however, that a battery pack 805 and electronics unit 810 may be positioned elsewhere in tabletop display device 800, and thus recess 801 may remain empty in some embodiments.

In general, various embodiments of the apparatus described herein include first and second touch screens positioned within a housing in close proximity to teach other, with one or more attenuation layers positioned therebetween. The attenuation layers are arranged such that the disturbance of an electric field resulting from a touch on one of the touch screens may have little if any substantial affect on the touch screen on the other side. This may enable two touch screens that are placed in close proximity to each other to be operated independently of one another. The various arrangements discussed are but some of the many possible examples of tabletop display devices that may be implemented using a two-sided touch screen configuration.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A two-sided touch screen unit comprising:
a housing;
a first touch screen positioned in the housing and facing a first direction;
a second touch screen positioned in the housing and facing a second direction that is substantially opposite of the first direction; and
at least one attenuation layer positioned between the first touch screen and the second touch screen;
a first backlight diffuser coupled between the attenuation layer and the first touch screen, and a second backlight diffuser coupled between the attenuation layer and the second touch screen;
a backlight diffuser, a first attenuation layer coupled between the first touch screen and the backlight diffuser, and a second attenuation layer coupled between the second touch screen and the backlight diffuser, wherein each of the first and second attenuation layers are coupled to an electrical ground;
wherein the at least one attenuation layer prevents a touch on the first touch screen from being registered by the second touch screen to enable each touch screen to operate independently of the other touch screen;
wherein the attenuation layer is an electrically conductive wire mesh, wherein the wire mesh is coupled to said electrical ground;
wherein the first and second attenuation layers each comprises a conductive film on their respective sides of the backlight diffuser;
wherein a user input on the first touch screen is receivable concurrently with a user input on the second touch screen;
wherein each of the first and second touch screens includes a protective layer, a touch sensor, and a display arranged between the protective layer and the touch sensor;
wherein each of the first and second attenuation layers includes a plurality of apertures;
wherein the attenuation layer includes a recess having one or more batteries contained therein;
wherein the attenuation layer includes a recess having electronic circuitry contained therein;
wherein the attenuation layer includes a recess having conductive paint applied to its surfaces therein;
wherein the touch sensor is a capacitive touch sensor;
wherein the attenuation layer includes a plurality of apertures; and, wherein the attenuation layer comprises a non-transparent material.

2. A tabletop display device comprising:
a housing;
a first touch screen positioned in the housing and facing a first direction;
a second touch screen positioned in the housing and facing a second direction that is substantially opposite of the first direction;
at least one attenuation layer positioned between the first touch screen and the second touch screen;
an electronics unit, wherein the electronics units includes at least one electronic device configured to, response to a touch on the first touch screen, process first information, and further configured to, responsive to a touch on the second touch screen, process second information, wherein processing said first information and processing said second information are performed independently of one another;
a first backlight diffuser coupled between the attenuation layer and the first touch screen, and a second backlight diffuser coupled between the attenuation layer and the second touch screen;
a backlight diffuser, a first attenuation layer coupled between the first touch screen and the backlight diffuser, and a second attenuation layer coupled between the second touch screen and the backlight diffuser, wherein each of the first and second attenuation layers are coupled to an electrical ground;
wherein the at least one attenuation layer prevents the touch on the first touch screen from being registered by the second touch screen, and prevents the touch on the second touch screen from being registered by the first touch screen to enable each touch screen to operate independently of the other touch screen:
wherein each of the first and second touch screens includes a protective layer, a touch sensor, and a display arranged between the protective layer and the touch sensor;
wherein the first and second attenuation layers each comprises a conductive film on their respective sides of the backlight diffuser;
wherein each of the first and second attenuation layers includes a plurality of apertures;
wherein the attenuation layer includes a recess having one or more batteries contained therein;
wherein the attenuation layer includes a recess having electronic circuitry contained therein;
wherein the attenuation layer includes a recess having conductive paint applied to its surfaces therein;
wherein the attenuation layer is an electrically conductive wire mesh, wherein the wire mesh is coupled to an electrical ground; and,
wherein the attenuation layer comprises a non-transparent material.

* * * * *